United States Patent
Pacho Iglesias et al.

(10) Patent No.: US 12,224,593 B2
(45) Date of Patent: Feb. 11, 2025

(54) WIND TURBINE CONTROL SYSTEM AND METHOD

(71) Applicant: Siemens Gamesa Renewable Energy Innovation & Technology S.L., Sarriguren (ES)

(72) Inventors: Gemma Pacho Iglesias, Arrigorriaga (ES); Emilio David Rebollo López, Madrid (ES); Elena Sáiz Marín, Madrid (ES); Emilio José Bueno Peña, Alcalá de Henares (ES); Aitor Saenz Aguirre, Guipuzkoa (ES); Alejandro Tejada Armada, Navarra (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/555,448

(22) PCT Filed: Apr. 7, 2022

(86) PCT No.: PCT/EP2022/059325
§ 371 (c)(1),
(2) Date: Oct. 13, 2023

(87) PCT Pub. No.: WO2022/218826
PCT Pub. Date: Oct. 20, 2022

(65) Prior Publication Data
US 2024/0195184 A1 Jun. 13, 2024

(30) Foreign Application Priority Data
Apr. 16, 2021 (EP) .................................... 21382327

(51) Int. Cl.
*H02J 3/48* (2006.01)
*F03D 9/25* (2016.01)
*H02J 3/38* (2006.01)

(52) U.S. Cl.
CPC ................ *H02J 3/48* (2013.01); *F03D 9/255* (2017.02); *H02J 3/381* (2013.01);
(Continued)

(58) Field of Classification Search
CPC .......... H02J 3/48; H02J 3/381; H02J 2300/28; F03D 9/255; F05B 2270/337
See application file for complete search history.

(56) References Cited

U.S. PATENT DOCUMENTS

| 7,345,373 B2 | 3/2008 | Delmerico et al. |
| 9,128,133 B2 | 9/2015 | Jimenez Buendia |
(Continued)

FOREIGN PATENT DOCUMENTS

EP 2918824 A1 9/2015

OTHER PUBLICATIONS

Eberlein Simon et al: "Influence of PLL on synthetic inertia of DFIG wind turbine in droop controlled microgrids", The Journal of Engineering, The Institution of Engineering and Technology, Michael Faraday House, Six Hills Way, Stevenage, Herts. SG1 2AY, UK, vol. 2019, No. 18, Jul. 1, 2019 (Jul. 1, 2019), pp. 5314-5319, XP006085745, DOI: 10.1049/JOE.2018.9316.
(Continued)

*Primary Examiner* — Sean Gugger
(74) *Attorney, Agent, or Firm* — Schmeiser, Olsen & Watts LLP (57) ABSTRACT

A wind turbine control system and method, for the type of wind turbines includes a rotor, an asynchronous generator driven by the rotor and configured for providing an active power to a grid, and a power converter connected to the generator and configured to interact with the generator for generating the required active power for the grid. The control system includes a converter control unit for controlling the power converter and for estimating a frequency derivative of the frequency of the grid, and a wind turbine controller configured for receiving the estimated frequency derivative and for considering the received frequency derivative for determining a synthetic inertia. The converter
(Continued)

control unit controls the power converter to cause the generator to also provide the synthetic inertia, in the form of active power.

11 Claims, 6 Drawing Sheets

(52) U.S. Cl.
CPC ..... *F05B 2270/337* (2013.01); *H02J 2203/10* (2020.01); *H02J 2300/28* (2020.01)

(56) References Cited

U.S. PATENT DOCUMENTS 9,728,969 B2 8/2017 Tarnowski
2019/0003456 A1* 1/2019 Garcia ................... G05B 15/02

OTHER PUBLICATIONS

PCT International Search Report and Written Opinion of International Searching Authority mailed Jul. 13, 2022 corresponding to PCT International Application No. PCT/EP2022/059325 filed Apr. 7, 2022.

* cited by examiner

WIND TURBINE CONTROL SYSTEM AND METHOD

This application claims priority to PCT Application No. PCT/EP2022/059325, having a filing date of Apr. 7, 2022, which claims priority to EP Application No. 21382327.1, having a filing date of Apr. 16, 2021, the entire contents both of which are hereby incorporated by reference.

FIELD OF TECHNOLOGY

The following relates to wind turbine control systems, and particularly to wind turbine control systems adapted for supplying a synthetic inertia to a power grid, in the form of active power, to counteract a frequency disturbance in said power grid.

BACKGROUND

Wind turbines convert the kinetic energy of the wind into electricity, which is then transmitted to a substation in a wind farm. This wind farm has at least one wind farm controller and at least one wind turbine comprising a rotor, which drives a generator that interacts with a power converter to generate electricity; a wind turbine controller equipped with a blade pitch angle controller and a generated power controller, a converter control unit, which interacts with the wind turbine controller; and a regulation system that coordinates the different wind turbine controllers on the basis of a series of parameters such as turbine rotation speed or grid frequency.

The nacelle on a wind turbine normally houses different components together with a transmission shaft that converts mechanical energy into electricity through a generator that interacts with a power converter. The transmission shaft in a wind turbine means the assembly between the rotor, rotor shaft, gearbox, generator shaft and generator.

The purpose of the wind turbine controller is to maximize active power generation up to a its maximum power limit and to maintain a secure operating mode to prevent personal injuries and wind turbine damage. This wind turbine controller defines a blade pitch angle, sent to the pitch actuator to move the blades to the correct position, and an active power reference point as a reference for the converter controller located in the converter control unit.

Traditional passive paradigm of wind turbines should be replaced by a more active one in order to contribute to the system and thus grid operators are increasingly toughening wind turbine-to-grid coupling conditions. Some of these requirements are defined in terms of frequency transients that wind turbines must be capable of withstanding without uncoupling from the grid and even to react to help the system recover the grid frequency to its pre-established nominal values.

Transmission system operators are particularly concerned with frequency transients, normally arising when disconnecting the generator, loads or even a part of the transmission system, and consequently causing the grid frequency to change suddenly beyond its nominal values because of the difference between produced active power and consumed active power.

This change in frequency requires a very rapid response to prevent the frequency from surpassing its maximum ranges and provoking a cascading disconnection of generators and electricity consumers.

Generators and power systems need to control the frequency, and for that purpose they generally comprise a plurality of control loops. As a result of said control loops a sudden drop or surge in the frequency of a grid is compensated. A first natural response for conventional generators is known as inertial response, which entails the delivery of instantaneous power because of the stored rotational energy in the shafts. A second response comes from a specific controller that increases the generation of power proportionally to the grid frequency deviation regarding to the nominal frequency, a response requiring some 15 to 60 seconds yet arresting the rising/falling frequency. However, this response, known as primary response, does not permit a return to the nominal frequency. The third and fourth responses, known as secondary or tertiary, are based on managing the generation of active power from generators, including the start-up of generation units hitherto offline with a view to moving the grid frequency value to the nominal frequency value.

In this regard, insofar as the inertial response, conventional power plants using synchronous machines such as generators are rigidly connected to the grid, thus a change in frequency directly translates into a proportional change in the turbine rotational speed. The mechanical inertia of a synchronous generator thus has an essential role, since this inertia could be viewed as a conversion of a rotating mass's kinetic energy into electricity fed to the grid, whereby helping the grid reduce the frequency drop/spike.

The conversion of kinetic energy into electricity can be expressed in active power generation, i.e., rotational energy is proportional to the square of the turbine's rotational speed, which is proportional to the grid frequency. Given that power is the amount of energy per unit of time, the power delivered, due to the change in frequency, can be expressed by mathematical deduction as negatively proportional to the frequency change rate.

However, the power generating systems based on power converters do not have this "natural" response (inertial response) to grid frequency changes. This is the case of wind turbines based on power converters, for example, where the required electronic converter controllers uncouple the frequency from the generator rotational speed. Therefore, said type of wind turbines do not naturally reduce their speed in relation to the frequency of the grid and do not deliver this energy by moving the rotor. Said type of wind turbines do not buffer frequency drops/spikes.

Given that wind power is becoming an essential part of the electricity system, an incapacity to provide inertial response results in a reduction of the inertia in the system and, consequently, an increase in the Rate of Change of Frequency (ROCOF) in case of a disturbance. Accordingly, natural synchronous response should be emulating, contributing to power system stability.

Wind turbines with inertia control can be useful for reducing ROCOF and support power system stability. For wind turbines, the conceptual approach goes through increasing the active power and feeding it into the electricity grid dynamically and quickly, within a few seconds, using the inertia of the generator. To carry out this type of control, inertia emulators are used, which simulate the presence of an inertia to achieve the highlighted objective.

EP2918824A1 discloses an inertia control system for the type of wind turbines that comprises a rotor, generator driven by the rotor that interacts with a power converter to generate electricity, a wind turbine controller that comprises a blade pitch controller and a generated power controller, and a converter control unit that interacts with the wind turbine controller. The inertia control system comprises an inertia emulation block implemented in the wind turbine controller, to prevent distortion in the active power output after the addition or subtraction of power proportional to the frequency change rate, by generating an extra power signal (synthetic inertia), negatively proportional to the frequency change rate.

The U.S. Pat. No. 7,345,373 B2 refers to a wind turbine system including a wind turbine generator operable to supply wind turbine power to a utility system, and a converter coupled to the wind turbine generator and the utility system.

The U.S. Pat. No. 9,128,133 B2 discloses a method and module for measuring the rate of change of frequency of a waveform related to a converter unit of a wind turbine generator.

The U.S. Pat. No. 9,728,969 B2 discloses a systems, methods, and a computer program for providing an inertial response by a wind power system to power fluctuations in an electrical grid. The system includes a synthetic inertial response generator configured to generate a power offset in response to fluctuations in grid voltage.

Publication XP006085745 in THE JOURNAL OF ENGINEERING, THE INSTITUTION OF ENGINEERING AND TECHNOLOGY, MICHAEL FARADAY HOUSE, SIX HILLS WAY, STEVENAGE, HERTS, SG1 2AY, UK, vol. 2019, no. 18, 1 Jul. 2019 (2019 Jul. 1), pages 5314-5319, by EBERLEIN SIMON ET AL, is entitled "Influence of PLL on synthetic inertia of DFIG wind turbine in droop controlled microgrids".

SUMMARY

An aspect relates to provide a wind turbine control system and a method, for stabilizing an AC power grid by providing a synthetic inertia calculated according to an estimated frequency derivative.

In a first aspect, a wind turbine control system is provided. The control system is adapted for the type of wind turbines comprising a rotor, an asynchronous generator driven by the rotor and configured for providing an active power to a power grid, and a power converter connected to the generator and configured to interact with said generator for generating the required active power for the power grid. The active power is generated according to the rotary speed of the rotor, and, thus, the provided active power is controlled regulating said rotor speed by means of a rotor speed controller.

The control system comprises a converter control unit configured for controlling the power converter, and a wind turbine controller for controlling the wind turbine and communicated with the converter control unit. The wind turbine controller comprises a rotor speed controller configured for calculating an active power reference to be provided by the wind turbine, said rotor speed controller comprising an inertia emulation block configured for calculating a synthetic inertia to be provided to the power grid, in the form of active power, to counteract a frequency disturbance in said power grid. Said synthetic inertia is negatively proportional to the frequency change rate (or frequency derivative) of the frequency of the power grid.

The converter control unit comprises an estimator block configured for receiving the frequency of the power grid and for estimating the grid voltage phase angle for synchronization the actuation of the power converter with the frequency of the power grid, and a frequency derivative estimator configured for receiving the frequency of the power grid and for estimating the frequency derivative of said frequency.

The wind turbine controller and the converter control unit are communicated such that said wind turbine controller is configured for receiving the frequency derivative estimated by the frequency derivative estimator of said converter control unit. The rotor speed controller of said wind turbine controller is configured for considering said received frequency derivative for determining the active power to be provided by the wind turbine.

Being the converter control unit the unit in charge of determining the frequency derivative allows a faster reaction time to frequency changes, as the dynamic of the converter control unit is faster than one in the wind turbine controller. Furthermore, in order to prevent from negatively affecting the dynamics of the converter control unit, a parallel synchronizing unit is considered (the estimator block). Therefore, a quicker response to the disturbances of the frequency of the grid is obtained, the grid stability being assured in a greater extend.

In an example, the estimator block may comprise a Phase-locked loop for estimating the phase-angle and in another example the estimator block may comprise a Frequency-locked loop for estimating the frequency, said estimator block including at least one first regulator with first predetermined parameters. The frequency derivative estimator may comprise a Phase-locked loop in an example, and a Frequency-locked loop in another example, said frequency derivative estimator including at least one second regulator with second predetermined parameters. By selecting the appropriate value for the second predetermined parameters of the loop of the frequency derivative estimator, a more dynamic response than the dynamic response provided by the grid voltage phase angle or frequency estimator block derived from the first predetermined parameters can be obtained.

In an example, the frequency derivative estimator comprises a second order generalized integrator, in order to eliminate, or at least substantially reduce, the error during the generation of the frequency derivative, said frequency derivative being thus generated without error.

In an example, the rotor speed controller of the wind turbine controller may comprise a maximum power point tracking controller for calculating a related active power and for calculating the active power reference adding the estimated synthetic inertia to said related active power. Therefore, a more optimal active power reference may be achieved.

In a further aspect a wind farm is provided, said wind farm comprising a wind farm controller and at least one wind turbine comprising a rotor, an asynchronous generator driven by the rotor and configured for providing an active power to a power grid, and a power converter connected to the generator and configured to interact with said generator for generating active power for the power grid. The wind farm further comprises a wind turbine control system according to the preceding aspect.

In a further aspect a method for stabilizing an AC power grid is provided. The method stabilizes the grid by providing a synthetic inertia to said power grid, in the form of active power, from a generator of a wind turbine connected to said power grid, to counteract a frequency disturbance in said power grid.

The method comprises interacting the generator by means of a power converter to supply the required active power and controlling said power converter by means of a converter control unit communicated with a wind turbine controller. The wind turbine controller calculates the synthetic inertia, said synthetic inertia being negatively proportional to the frequency change rate of the frequency of the power grid.

The converter control unit estimates the grid voltage phase angle, or frequency, for synchronization the actuation of the power converter with the frequency of the power grid based on the frequency of the grid, and also estimates the frequency derivative of said frequency to be used to calculate the synthetic inertia.

The wind turbine controller receives the frequency derivative estimated by the converter control unit and considers said received frequency derivative for determining the synthetic inertia. The advantages described for the first aspect of embodiments of the invention are also obtained with the method.

In an example, the method may comprise estimating the frequency derivative by applying a second order generalized integrator, in order to eliminate, or at least substantially reduce, the error during the generation of the frequency derivative, said frequency derivative being thus generated without error.

In an example, the method may comprise calculating an active power related to the maximum power point, by the wind turbine controller, and adding the estimated synthetic inertia to said calculated active power to obtain an active power reference to be provided by the wind turbine. Therefore, a more optimal active power reference may be achieved.

In an example, the grid voltage phase angle or frequency and the frequency derivative may be estimated in parallel. This fact prevents the estimation of the frequency from negatively affecting the dynamics of the converter control unit.

These and other advantages and features of embodiments of the invention will become apparent in view of the figures and detailed description of embodiments of the invention.

BRIEF DESCRIPTION

Some of the embodiments will be described in detail, with reference to the following figures, wherein like designations denote like members, wherein.

DETAILED DESCRIPTION

Figure 1:
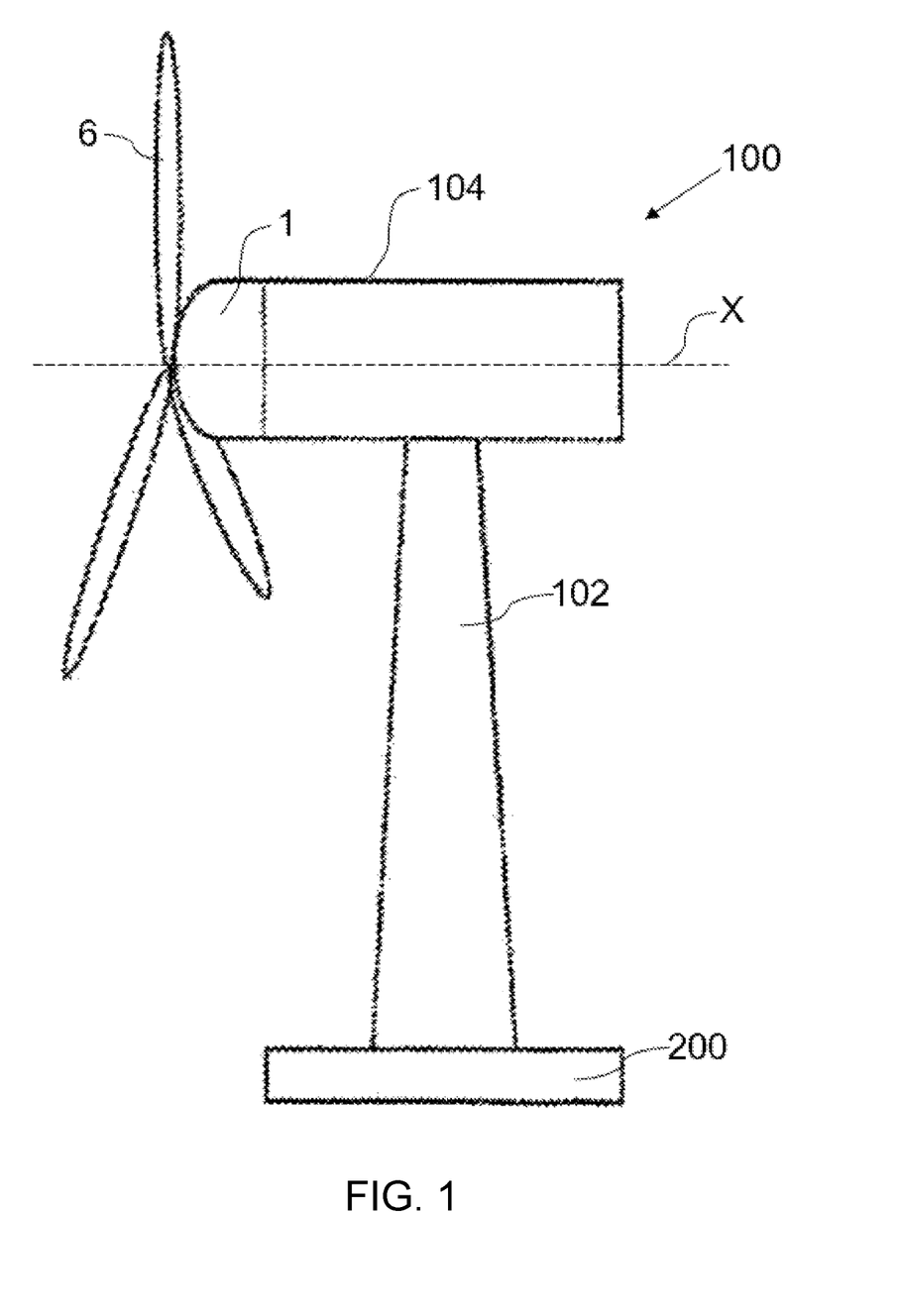
FIG. 1 schematically shows a wind turbine, according to an example.

The proposed wind turbine control system is configured for wind turbines 100 of the example of FIG. 1. The wind turbine 100 may comprise a rotor 1 and an asynchronous generator 2 which may be driven by the rotor 1 and which may be configured for providing an active power to a power grid. The wind turbine 100 may further comprise a power converter 3 connected to the generator 2 and which may be configured to interact with said generator 2 for generating the required active power for the power grid. Such a wind turbine 100 is shown by way of example in FIGS. 1 and 2.

A wind turbine 100 may further comprise a tower 102 that stands vertically on a foundation 200, a nacelle 104 mounted on the top part of the tower 102, and a plurality of blades 106 connected to the rotor 1. The rotor 1 may be mounted on the front end of the nacelle 104. The wind causes the rotation of the blades 106 around a rotating axis X of the wind turbine 100, and said rotation causes the rotation of the rotor 1 together with the blades 6. Said rotation is converted into electrical energy to be supplied to a power grid. A wind turbine 100 may be part of a wind farm (not shown). The wind farm may comprise, at least one, or a plurality of wind turbines 100, and also a wind farm controller (not shown).

Figure 2:
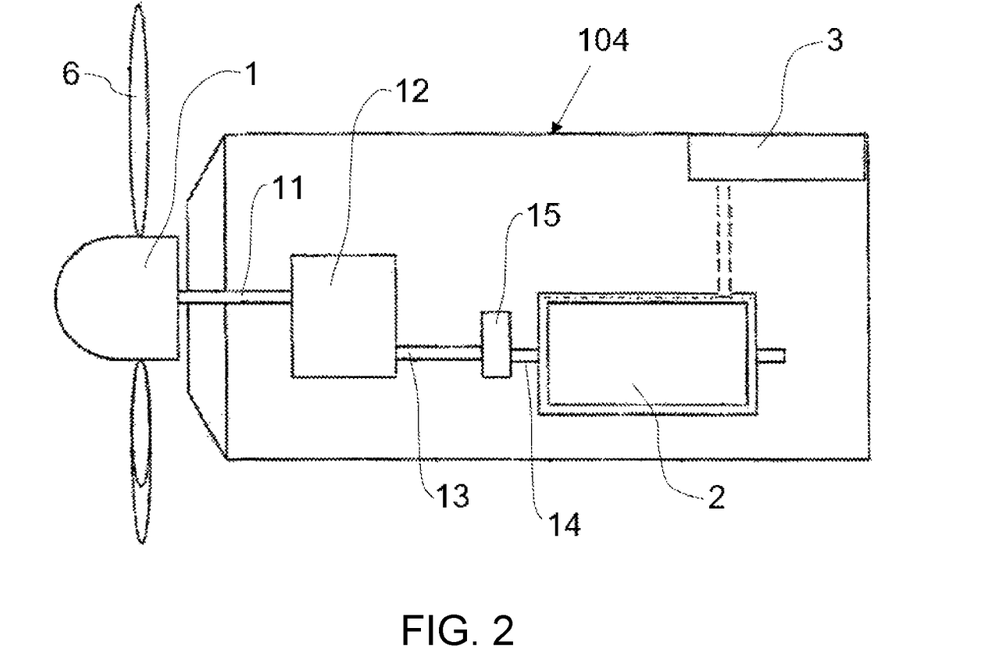
FIG. 2 schematically shows the interior of the nacelle of the wind turbine of FIG. 1.

The nacelle 104 may include various components constituting the drive train of the wind turbine 100 such as a rotor shaft 11, a gearbox 12, and a further shaft 13 connected to a generator input shaft 14 through a coupling 15, as shown in FIG. 2.

Figure 3:
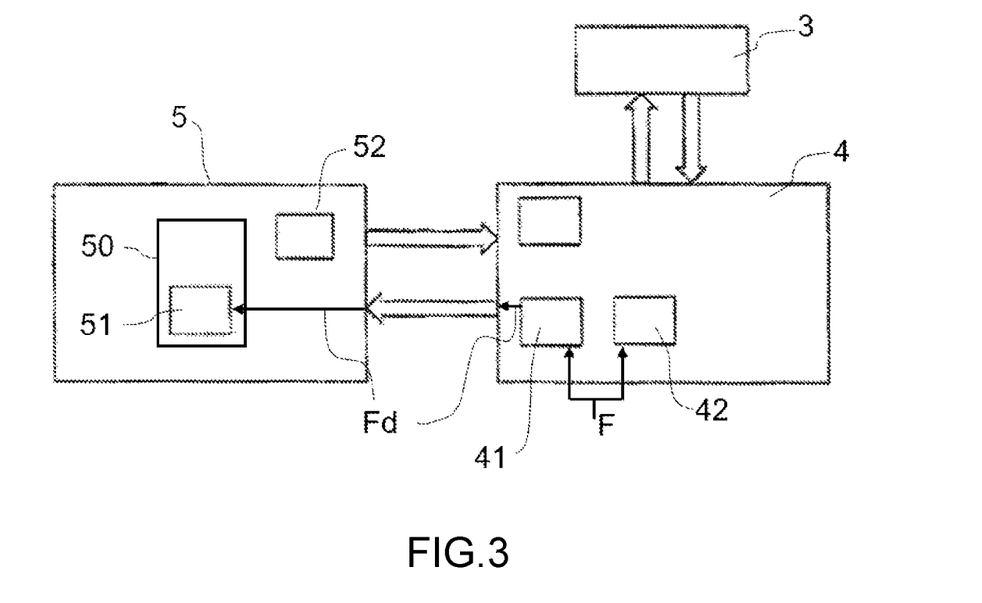
FIG. 3 schematically shows a wind turbine control system according to an example, for a wind turbine as the one shown in FIG. 1.
Figure 4:
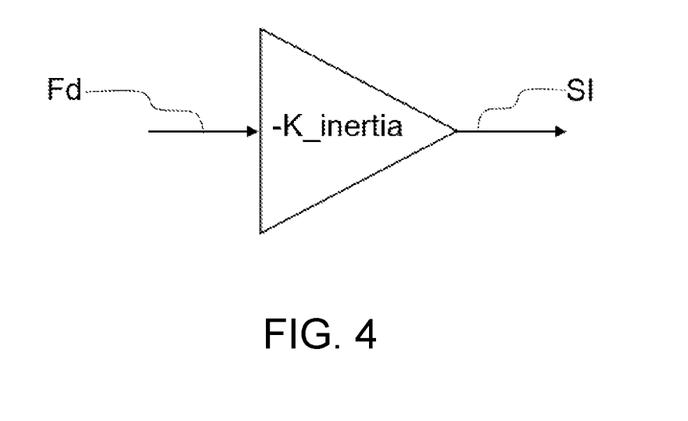
FIG. 4 shows an example of calculating the synthetic inertia to be supplied from the estimated frequency derivative.

As shown in FIG. 3, the wind turbine control system may comprise a converter control unit 4 configured for controlling the power converter 3 of the wind turbine 100, and a wind turbine controller 5 for the wind turbine 100, such as a Programmable logic controller (PLC). The wind turbine controller 5 may be communicated with the converter control unit 4 and may comprise a rotor speed controller 50 configured for calculating an active power reference. The rotor speed controller 50 may comprise a maximum power point tracking controller and may also include an inertia emulation block 51 which may be configured for calculating a synthetic inertia SI to be provided to the power grid, in the form of active power, to counteract a frequency disturbance in said power grid. The synthetic inertia SI may be negatively proportional K_inertia to the frequency change rate or frequency derivative Fd, also known as ROCOF (see FIG. 4). In other words, the synthetic inertia SI may be the result of a multiplication between the frequency change rate Fd of the frequency F of the power grid and the negative constant K_inertia. The constant K_inertia may be a predefined parameter or a parameter indicated by the wind farm controller e.g. through a wind turbine controller 5 of the wind turbine control system. Thus, the wind turbine controller 5 may be configured for obtaining the active power reference considering both the synthetic inertia SI and the maximum power point.

The converter control unit 4 may comprise an estimator block 42 which may be configured for receiving the frequency F of the power grid and for estimating the grid voltage phase angle for synchronization the actuation of the power converter 3 with the frequency F of the power grid, and a frequency derivative estimator 41 which may be configured for receiving the frequency F of the power grid and for estimating the frequency derivative Fd of said frequency F. In an example the estimator block 42 may comprise a grid voltage phase angle estimator block and in another example said estimator block 42 may comprise a frequency estimator block.

Figure 5:
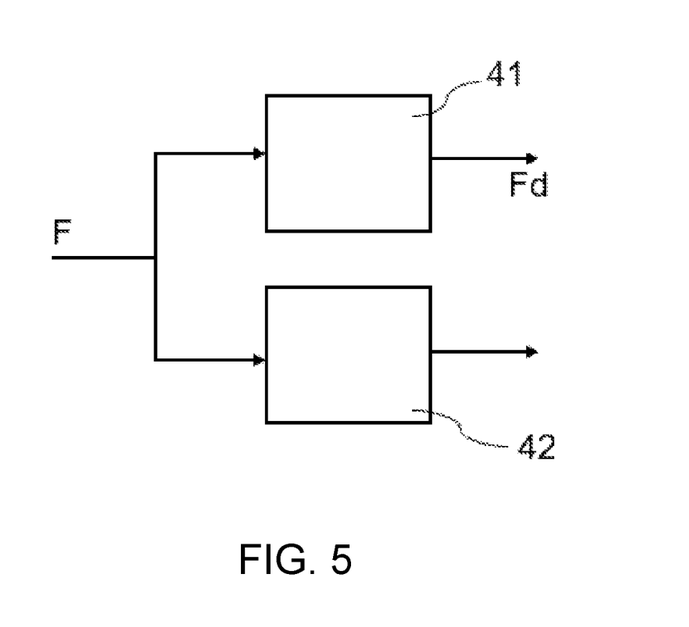
FIG. 5 shows a parallel connection between a frequency derivative estimator and an estimator block.

The estimator block 42 and the frequency derivative estimator 41 may be connected in parallel and said estimator block 42 and said frequency derivative estimator 41 may be configured for receiving the frequency F of the power grid as shown in FIGS. 3 and 5.

The wind turbine controller 5 and the converter control unit 4 may be communicated such that said wind turbine controller 5 may be configured to receive the frequency derivative Fd estimated by the frequency derivative estimator 41 of the converter control unit 4. The inertia emulation block 51 of the rotor speed controller 50 may be configured to receive the frequency derivative Fd, and also to calculate the synthetic inertia SI based on said frequency derivative Fd. The rotor speed controller 50 may also consider the received frequency derivative Fd for determining the active power to be provided by the wind turbine 100.

As the frequency derivative Fd is generated as described, a quicker response to the disturbances of the frequency F of the grid is obtained, thereby the grid stability may be assured in a greater extend. This effect is shown in FIG. 6.

FIG. 5 depicts part of a converter control unit according to any of the disclosed examples. The control unit may comprise an estimator block (42) and the frequency derivative estimator (41) according to any of the disclosed examples arranged in parallel. In an example, the estimator block may be a grid voltage phase angle estimator block. In an example, the estimator block may be a frequency estimator block.

Figure 6:
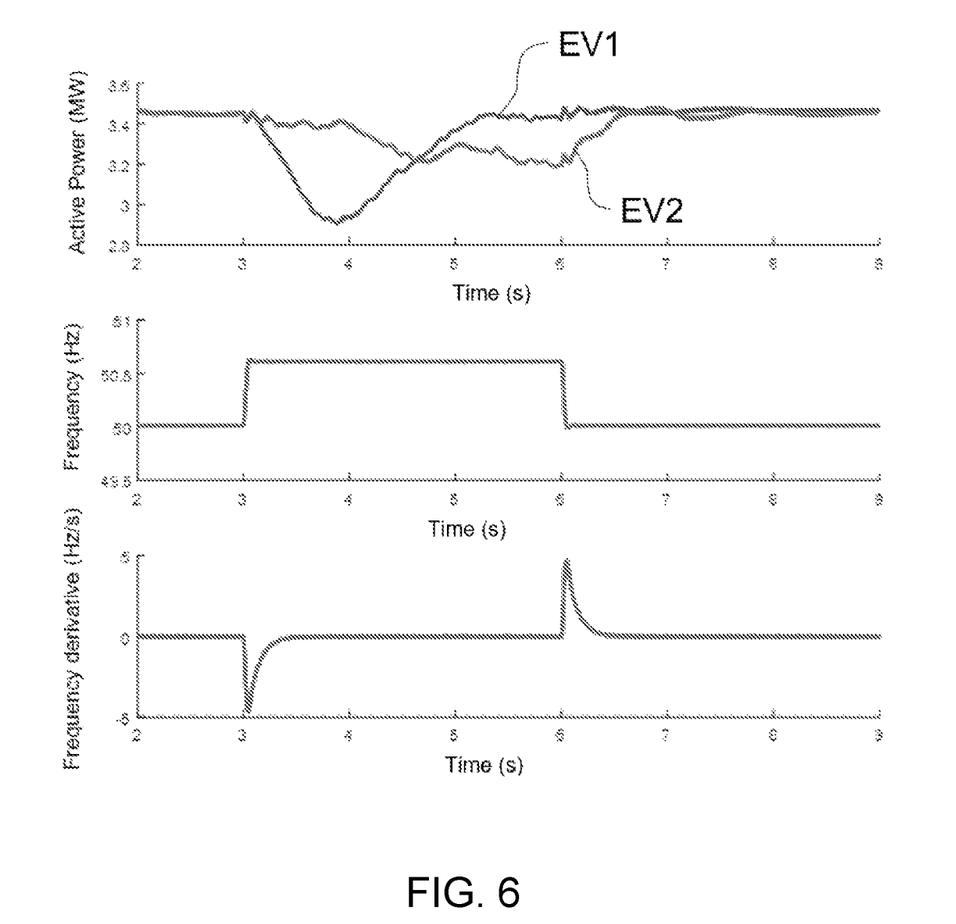
FIG. 6 shows an evolution of the active power supplied to a power grid by a wind turbine controlled according to an embodiment of the wind control system of embodiments of the invention, upon a frequency change of the power grid, compared with an evolution of the active power supplied to a power grid by a wind turbine controlled according to the conventional art.

FIG. 6 depicts an exemplary evolution EV1 of the active power supplied by a generator 2 controlled by a control system compared to an exemplary evolution EV2 of the active power supplied by a generator 2 controlled as in the conventional art, in response to a frequency change in the power grid.

The estimator block 42 may comprise a Phase-locked loop (PLL) for estimating the phase angle, in the example in which said estimator block 42 comprises a grid voltage phase angle estimator block, and a Frequency-locked loop (FLL) for estimating the frequency, in the example in which said estimator block 42 comprises a frequency estimator block, including in both examples at least one first regulator with predetermined first parameters. The first predetermined parameters may be selected to offer a good synchronization with the grid.

The frequency derivative estimator 41 may comprise a Phase-locked loop (PLL) or a Frequency-locked loop (FLL) including at least one second regulator with predetermined second parameters. The second predetermined parameters of the loop of the frequency derivative estimator 41 may be selected to offer a more dynamic response than the dynamic response provided by the estimator block 42 derived from the first predetermined parameters.

Additionally, the frequency derivative estimator 41 may comprise a second order generalized integrator (SOGI), in order to eliminate or at least substantially reduce the error during the generation of the frequency derivative Fd, said frequency derivative Fd being thus generated without error.

In an example, the wind turbine 100 may also comprise a pitch actuator (not shown) which may be configured to modify the pitch of the blades 6, in such examples, the wind turbine controller 5 may also comprise a pitch controller 52 for regulating the actuation of said pitch regulator.

In a further aspect of embodiments of the invention a method for stabilizing an AC power grid by providing a synthetic inertia SI to said power grid, in the form of active power, from an asynchronous generator of at least one wind turbine connected to said power grid, to counteract a frequency disturbance in said power grid, is provided. The method may comprise interacting 604 the generator 2 by means of a power converter 3 to supply the required active power and controlling 602 said power converter 3 by means of a converter control unit 4 communicated with a wind turbine controller 5 of the wind turbine 100. The wind turbine controller 5 may calculate the synthetic inertia SI, said synthetic inertia SI being negatively proportional K_inertia to the frequency change rate (also named as frequency derivative) Fd of the frequency F of the power grid.

Figure 7:
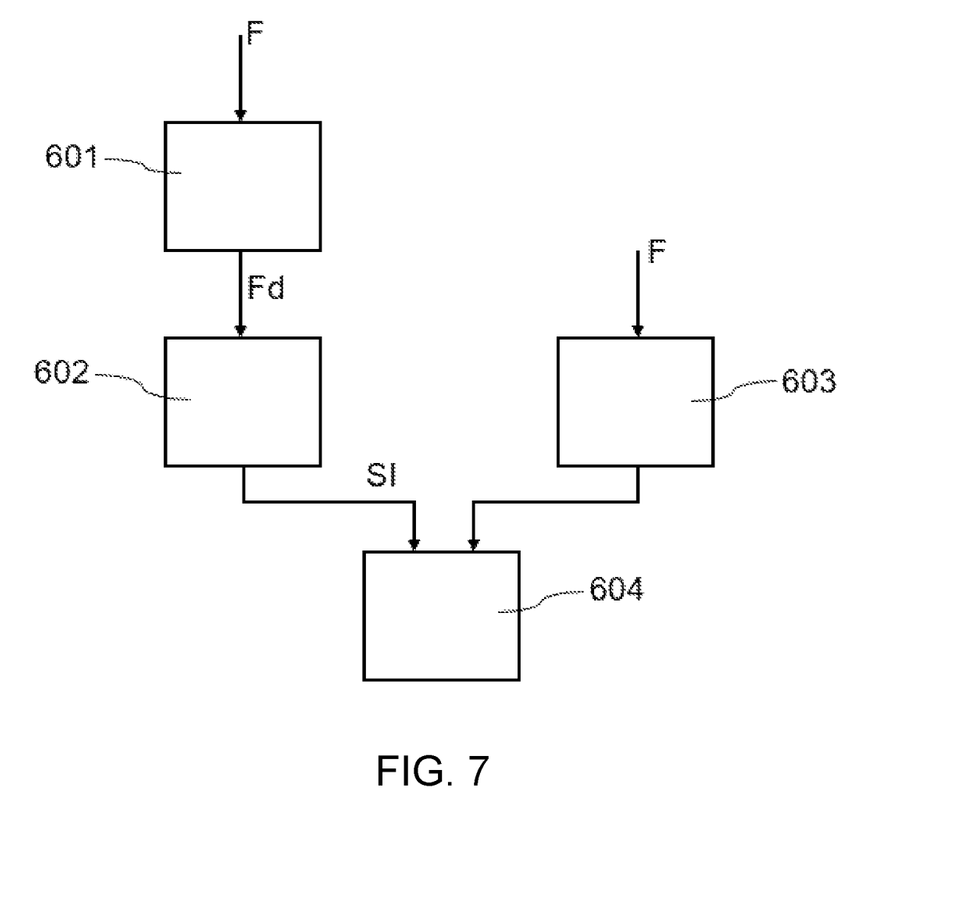
FIG. 7 schematically illustrates a flow chart of a method for stabilizing an AC grid according to an example.

The converter control unit 4 may estimate 603 (or calculate) the grid voltage phase angle for synchronization the actuation of the power converter 3 with the frequency F of the power grid based on the frequency F of the grid and, in parallel, may also estimate 601 the frequency derivative Fd of said frequency F to be used to calculate the synthetic inertia SI, as shown in the example of FIG. 7. The wind turbine controller 5 may receive the frequency derivative Fd estimated by the converter control unit 4 and may consider said received frequency derivative Fd for determining the synthetic inertia SI, in particular, said synthetic inertia SI may be negatively proportional K_inertia to said received frequency derivative Fd.

The converter control unit 4 may generate control signals for the power converter 3 in order to cause the generator 2 to also provide the synthetic inertia SI based on the frequency derivative Fd of the frequency of the power grid, said converter control unit 4 receiving the frequency F of the power grid and estimating the frequency derivative Fd of said frequency F using a Phase-locked loop (PLL) or a Frequency-locked loop (FLL) (in a frequency derivative estimator 41 of said converter control unit 4).

The grid voltage phase angle may be estimated in the converter control unit 4 (in an estimator block 42 of said converter control unit 4), for synchronization the actuation of the power converter 3 with the frequency F of the power grid, the estimation of said grid voltage phase angle and the calculation of the frequency derivative Fd being estimated in parallel. The grid voltage phase angle and the synthetic inertia SI to be provided may be both determined based on the same frequency F input.

In an example, the grid voltage phase angle may be estimated by means of a Phase-locked loop (PLL) that may be included in the estimator block 42. In another example, the grid voltage phase angle may be estimated by means of a Frequency-locked loop (FLL) that may be included in the estimator block 42. The configuration of said estimator block 42, and also of the frequency derivative estimator 41, may be as described for the first aspect of embodiments of the invention, a faster estimation of the frequency derivative Fd being obtained.

For estimating the frequency derivative Fd, in the method a second order generalized integrator (SOGI) may also be applied or used. Therefore, the error may be eliminated and therefore, the estimated frequency derivative Fd may be generated with a greater accuracy.

Figure 8:
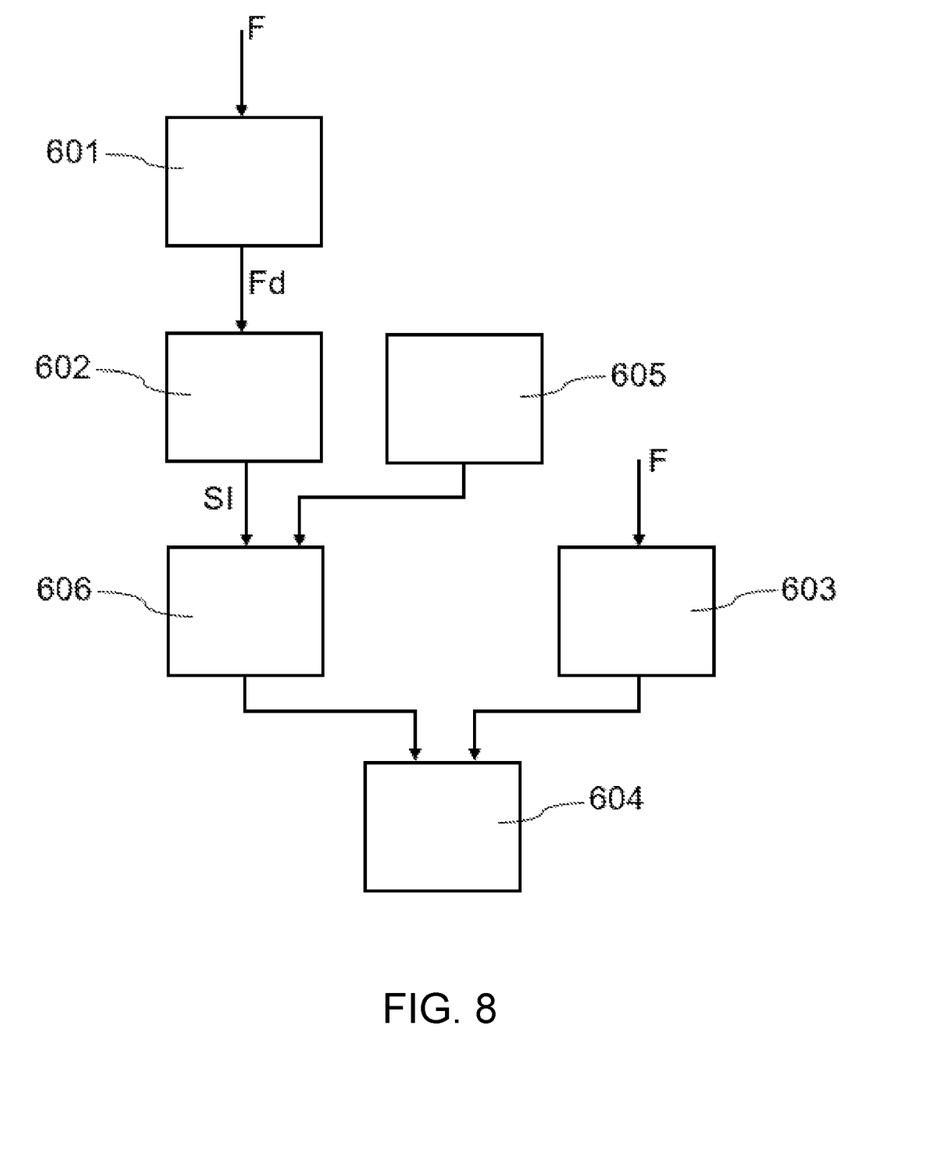
FIG. 8 schematically illustrates a flow chart of a method for stabilizing an AC grid according to another example.

In another example of the method as the one shown in FIG. 8, the turbine controller 5 may calculate 605 an active power related to the maximum power point, by means of a maximum power point tracking controller, and may add the estimated synthetic inertia SI to said calculated active power (block 606) to obtain an active power reference to be provided by the wind turbine 100. The blocks or steps 601, 602 and 603 and as described for the example of FIG. 6 may be also valid for the example of FIG. 8. The block or step 604 of the example of FIG. 8 receives the output of the block 606 and the output of the block 603.

The wind turbine control system can be configured for implementing the required configuration or realization of the method, being configured according to said configuration or realization. Therefore, the explanations given for the method are also valid for the wind turbine control system and vice versa.

FIG. 7 shows a flowchart of a method for stabilizing an AC power grid according to an example. The generator 2 may be interacted by means of a power converter 3 to supply the required active power. The power converter 3 may be controlled by means of a converter control unit 4 communicated with a wind turbine controller 5 according to any of the disclosed examples. The wind turbine controller 5 may, in block 602, calculate the synthetic inertia SI. The synthetic inertia SI may be negatively proportional K_inertia to the frequency change rate, i.e. the frequency derivative Fd of the frequency F of the power grid.

The converter control unit 4 may, in block 603, estimate the grid voltage phase angle for synchronization the actuation of the power converter 3 with the frequency F of the power grid based on the frequency F of the grid. In addition, in parallel to this estimation, the converter control unit 4 may, in block 601, estimate or calculate the frequency derivative Fd of said frequency F by a Phase-locked loop (PLL) or a Frequency-locked loop (FLL) e.g. comprised in a frequency derivative estimator 41 according to any of the disclosed examples. The wind turbine controller 5 may receive the frequency derivative Fd estimated by the converter control unit 4. Then, the wind turbine controller 5 may determine the synthetic inertia SI based on the received frequency derivative Fd (block 602). In an example, the synthetic inertia SI may be negatively proportional K_inertia to said received frequency derivative Fd.

The converter control unit 4 may, in block 604, receive the synthetic inertia SI and the output from the block 603 and may generate control signals for the power converter 3, based on said inputs, in order to cause the generator 2 to also provide the synthetic inertia SI based on the frequency derivative Fd of the frequency of the power grid.

The grid voltage phase angle may, in block 603, be estimated by the converter control unit 4 e.g., in an estimator block 42 of the converter control unit 4. In order to synchronize the actuation of the power converter 3 and the frequency F of the power grid, the estimation of the grid voltage phase angle and the calculation of the frequency derivative Fd may be estimated or calculated in parallel. In an example, the grid voltage phase angle and the synthetic inertia SI may be determined based on the same frequency F input.

In an example, the grid voltage phase angle may be estimated or calculated by means of a Phase-locked loop (PLL) that may be included in the estimator block 42, an in another example the frequency may be estimated or calculated by means of a Frequency-locked loop (FLL) that may be included in the estimator block 42. The configuration of said estimator block 42, and also of the frequency derivative estimator 41, may according to any of the disclosed examples. A faster frequency derivative Fd estimation may thus be obtained.

For estimating the frequency derivative Fd, a second order generalized integrator (SOGI) may also be applied or used. A greater accuracy may thus be obtained when estimating the frequency derivative Fd as the error may be eliminated or at least substantially reduced.

FIG. 8 shows a flowchart of a method for stabilizing an AC power grid according to an example. The generator 2 may be interacted by means of a power converter 3 to supply the required active power. The power converter 3 may be controlled by means of a converter control unit 4 communicated with a wind turbine controller 5 according to any of the disclosed examples. The wind turbine controller 5 may, in block 602, calculate the synthetic inertia SI. The synthetic inertia SI may be negatively proportional K_inertia to the frequency change rate, i.e., the frequency derivative Fd of the frequency F of the power grid.

The converter control unit 4 may, in block 603, estimate the grid voltage phase angle for synchronization the actuation of the power converter 3 with the frequency F of the power grid based on the frequency F of the grid. In addition, in parallel to this estimation, the converter control unit 4 may, in block 601, estimate or calculate the frequency derivative Fd of said frequency F by a Phase-locked loop (PLL) or a Frequency-locked loop (FLL) e.g., comprised in a frequency derivative estimator 41 according to any of the disclosed examples. The wind turbine controller 5 may receive the frequency derivative Fd estimated by the converter control unit 4. Then, the wind turbine controller 5 may determine the synthetic inertia SI based on the received frequency derivative Fd (block 602). In an example, the synthetic inertia SI may be negatively proportional K_inertia to said received frequency derivative Fd.

The wind turbine controller 5, in block 605, may calculate an active power related to the maximum power point, by means of a maximum power point tracking controller, and may add, in block 606, the estimated synthetic inertia SI to said calculated active power to obtain an active power reference to be provided by the wind turbine 100.

The converter control unit 4 may, in block 604, receive the output from block 606 and the output from the block 603 and may generate control signals for the power converter 3, based on said inputs, in order to cause the generator 2 to also provide the synthetic inertia SI based on the frequency derivative Fd of the frequency of the power grid.

The grid voltage phase angle may, in block 603, be estimated by the converter control unit 4 e.g., in an estimator block 42 of the converter control unit 4. In order to synchronize the actuation of the power converter 3 and the frequency F of the power grid, the estimation of the grid voltage phase angle and the calculation of the frequency derivative Fd may be estimated or calculated in parallel. In an example, the grid voltage phase angle and the synthetic inertia SI may be determined based on the same frequency F input.

In an example, the grid voltage phase angle may be estimated or calculated by means of a Phase-locked loop (PLL) that may be included in the estimator block 42, an in another example the frequency may be estimated or calculated by means of a Frequency-locked loop (FLL) that may be included in the estimator block 42. The configuration of said estimator block 42, and also of the frequency derivative estimator 41, may according to any of the disclosed examples. A faster frequency derivative Fd estimation may thus be obtained.

For estimating the frequency derivative Fd, a second order generalized integrator (SOGI) may also be applied or used. A greater accuracy may thus be obtained when estimating the frequency derivative Fd as the error may be eliminated or at least substantially reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine control system for wind turbines comprising a rotor, an asynchronous generator driven by the rotor and configured for providing an active power to a power grid, and a power converter connected to the generator and configured to interact with the generator for generating active power for the power grid, the control system comprising
a converter control unit configured for controlling the power converter and
a wind turbine controller for the wind turbine, the wind turbine controller having a rotor speed controller configured for calculating an active power reference to be provided by the wind turbine and the rotor speed controller including an inertia emulation block configured for calculating a synthetic inertia to be provided to the power grid, in the form of active power, to counteract a frequency disturbance in the power grid, the synthetic inertia being negatively proportional to the frequency change rate or frequency derivative of the frequency of the power grid, wherein the converter control unit comprises
an estimator block configured for receiving the frequency of the power grid and for estimating the grid voltage phase angle or frequency, for synchronizing the actuation of the power converter with the frequency of the power grid, and
a frequency derivative estimator configured for receiving the frequency of the power grid and for estimating the frequency derivative of the frequency, and wherein the wind turbine controller and the converter control unit are communicated such that the wind turbine controller can receive the frequency derivative estimated by the frequency derivative estimator of the converter control unit, the rotor speed controller of the wind turbine controller being configured for considering the received frequency derivative for determining the synthetic inertia.

2. The wind turbine control system according to claim 1, wherein the estimator block comprises a Phase-locked loop for estimating the phase-angle including at least one first regulator with first predetermined parameters, and the frequency derivative estimator comprises a Phase-locked loop or a Frequency-locked loop including at least one second regulator with second predetermined parameters, the second predetermined parameters of the loop of the frequency derivative estimator being selected to offer a more dynamic response than the dynamic response provided by the estimator block derived from the first predetermined parameters.

3. The wind turbine control system according to claim 1, wherein the estimator block comprises a Frequency-locked loop for estimating the frequency including at least one first regulator with first predetermined parameters, and the frequency derivative estimator comprises a Phase-locked loop or a Frequency-locked loop including at least one second regulator with second predetermined parameters, the second predetermined parameters of the loop of the frequency derivative estimator being selected to offer a more dynamic response than the dynamic response provided by the estimator block derived from the first predetermined parameters.

4. The wind turbine control system according to claim 2, wherein the frequency derivative estimator comprises a second order generalized integrator.

5. The wind turbine control system according to claim 1, wherein the rotor speed controller of the wind turbine controller comprises a maximum power point tracking controller for calculating a related active power and for calculating the active power reference adding the estimated synthetic inertia to the related active power.

6. The wind turbine control system according to a claim 1, wherein the estimator block and the frequency derivative estimator are connected in parallel, both the estimator block and the frequency derivative estimator being configured for receiving the frequency of the power grid.

7. A wind farm comprising a wind farm controller and at least one wind turbine comprising a rotor, an asynchronous generator driven by the rotor and configured for providing an active power to a power grid, and a power converter connected to the generator and configured to interact with the generator for generating active power for the power grid, wherein the farm further comprises the wind turbine control system according to claim 1, for the wind turbine.

8. The method according to claim 1, wherein the grid voltage phase angle or frequency and the frequency derivative are estimated in parallel.

9. A method for stabilizing an AC power grid by providing a synthetic inertia to the power grid to counteract a frequency disturbance in the power grid, in the form of active power, from an asynchronous generator of at least one wind turbine connected to the power grid, the method comprising
interacting the generator by means of a power converter to supply the required active power and controlling the power converter by means of a converter control unit communicated with a wind turbine controller, and
calculating the synthetic inertia by the wind turbine controller, wherein the synthetic inertia is negatively proportional to the frequency change rate or frequency derivative of the frequency of the power grid, wherein the method further comprises
estimating, by the converter control unit, the grid voltage phase angle or frequency for synchronizing the actuation of the power converter with the frequency of the power grid based on the frequency of the grid and,
estimating the frequency derivative of the frequency to be used to calculate the synthetic inertia, the wind turbine controller receiving the frequency derivative estimated by the converter control unit and considering the received frequency derivative for determining the synthetic inertia.

10. The method according to claim 9, wherein estimating the frequency derivative is done by applying a second order generalized integrator.

11. The method according to claim 9, further comprising calculating an active power related to the maximum power point, by the wind turbine controller, and
adding the estimated synthetic inertia to the calculated active power to obtain an active power reference to be provided by the wind turbine.

* * * * *